(12) United States Patent
Marley

(10) Patent No.: US 12,715,786 B1
(45) Date of Patent: Aug. 25, 2026

(54) SYSTEM FOR IN SITU FILTRATION OF WATER SUPPLY

(71) Applicant: Loureiro Engineering Associates, Inc., Plainville, CT (US)

(72) Inventor: Michael C. Marley, Newburyport, MA (US)

(73) Assignee: Loureiro Engineering Associates, Inc., Plainville, CT (US)

(*) Notice: Subject to any disclaimer, the term of this patent is extended or adjusted under 35 U.S.C. 154(b) by 0 days.

(21) Appl. No.: 19/064,917

(22) Filed: Feb. 27, 2025

(51) Int. Cl.

| | |
|---|---|
| ***C02F 1/28*** | (2023.01) |
| ***B09C 1/00*** | (2006.01) |
| ***C02F 101/36*** | (2006.01) |
| ***C02F 103/06*** | (2006.01) |

(52) U.S. Cl.
CPC .............. *C02F 1/283* (2013.01); *B09C 1/002* (2013.01); *B09C 2101/00* (2013.01); *C02F 2101/36* (2013.01); *C02F 2103/06* (2013.01)

(58) Field of Classification Search
CPC .. C02F 1/283; C02F 2101/36; C02F 2103/06; B09C 1/002; B09C 2101/00
See application file for complete search history.

(56) References Cited

U.S. PATENT DOCUMENTS 4,254,831 A * 3/1981 Nuzman ................. E21B 43/30 166/252.1
4,664,809 A * 5/1987 Fenton ...................... C02F 1/28 210/663
5,362,394 A 11/1994 Blowes et al.
5,728,302 A * 3/1998 Connor .................. E21B 43/02 210/683
11,479,489 B1 10/2022 Greene et al.
2007/0297858 A1 12/2007 Imbrie
2010/0098494 A1 4/2010 Pugh et al.
2021/0214241 A1 7/2021 Newell et al.
(Continued)

FOREIGN PATENT DOCUMENTS

CN 114604983 A 6/2022
DE 1005054666 A1 5/2007
(Continued)

OTHER PUBLICATIONS

McGregor, R., 2018. In situ treatment of PFAS-impacted groundwater using colloidal activated carbon. Remediation Journal, 28(3), pp. 33-41 (Year: 2018).*
(Continued)

*Primary Examiner* — Benjamin L Lebron
*Assistant Examiner* — Bernadette Karen Mcgann
(74) *Attorney, Agent, or Firm* — Secant IP, P.L.L.C.

(57) ABSTRACT

A system for removing PFAS compounds from ground water is provided. The system allows for deployment around drinking water wells to reduce the flux of PFAS compounds reaching the well. Instead of removing contaminants from a water supply after the water has been collected, the system allows for the deployment of an adsorbent directly in the soil. The adsorbent can remove the contaminant while allowing the water to continue its flow to a drinking water source such as a municipal well. Specific areas in the aquifer feeding the well can be targeted based on the flux of target compounds through those areas. The corresponding water quality in the well will meet the applicable regulatory standards, such as EPA MCLs.

15 Claims, 4 Drawing Sheets

(56) References Cited

U.S. PATENT DOCUMENTS

| | | | |
|---|---|---|---|
| 2022/0402778 | A1 | 12/2022 | Martel et al. |
| 2024/0116023 | A1 | 4/2024 | Mitchek et al. |

FOREIGN PATENT DOCUMENTS

| | | | | |
|---|---|---|---|---|
| EP | 1462187 | A2 * | 9/2004 | .............. C02F 1/283 |
| EP | 3027562 | B1 | 4/2018 | |
| EP | 3720572 | A1 | 10/2020 | |
| EP | 4288387 | A1 | 12/2023 | |
| JP | 2024-045044 | A2 | 4/2024 | |
| WO | WO2023238417 | A3 | 2/2023 | |
| WO | 2024/008836 | A1 | 1/2024 | |

OTHER PUBLICATIONS

Machine generated translation of EP-1462187-A2 (Year: 2004).*

"Project Story: PFAS Removal at the Sweeney Water Treatment Plant", Black & Veatch, You-Tube Video, https://www.youtube.com/watch?v=e20S8cDEcDw, Published Mar. 31, 2023.

McGregor, Rick, "In Situ Treatment of PFAS-Impacted Groundwater Using Colloidal Activated Carbon", Willey Periodicals, Inc., 2018, vol. 28, 9 pages.

Mackenzie, K. et al., "Colloidal Activated Carbon and Carbo-Iron—Novel Material for In-Situ Groundwater Treatment", Global NEST Journal, 2008, vol. 10, 8 pages.

International Search and Written Opinion issued in PCT/US2026/016859 dated Jun. 29, 2026.

* cited by examiner

SYSTEM FOR IN SITU FILTRATION OF WATER SUPPLY

FIELD OF THE DISCLOSURE

This disclosure relates generally to systems for removing contaminants from ground water and specifically to in situ systems around drinking water wells.

BACKGROUND

Water sources such as reservoirs, municipal wells, and domestic wells are fed by sources that can contain a number of undesirable contaminants such as organic compounds and heavy metals. Ex situ treatment systems are often employed to remove contaminants from municipal or domestic water supplies in order to meet regulatory requirements prior to distribution to the users.

SUMMARY

In one aspect, a system and method for removing contaminants from drinking water is provided. The system includes a filter wall comprising an adsorbent adhered to native substrate through which the drinking water flows. The filter wall can be selectively formed around specific portions of the periphery of the well to extract contaminants from groundwater that passes through those sections before entering the well. The adsorbent can be, for example, colloidally dispersed activated carbon. The well can be operated for extended periods of time with reduced contamination levels.

Numerous additional examples and variations will be apparent in light of the present disclosure.

The aspects and advantages described herein are not all-inclusive and, in particular, many additional aspects and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Figures 1, 2:
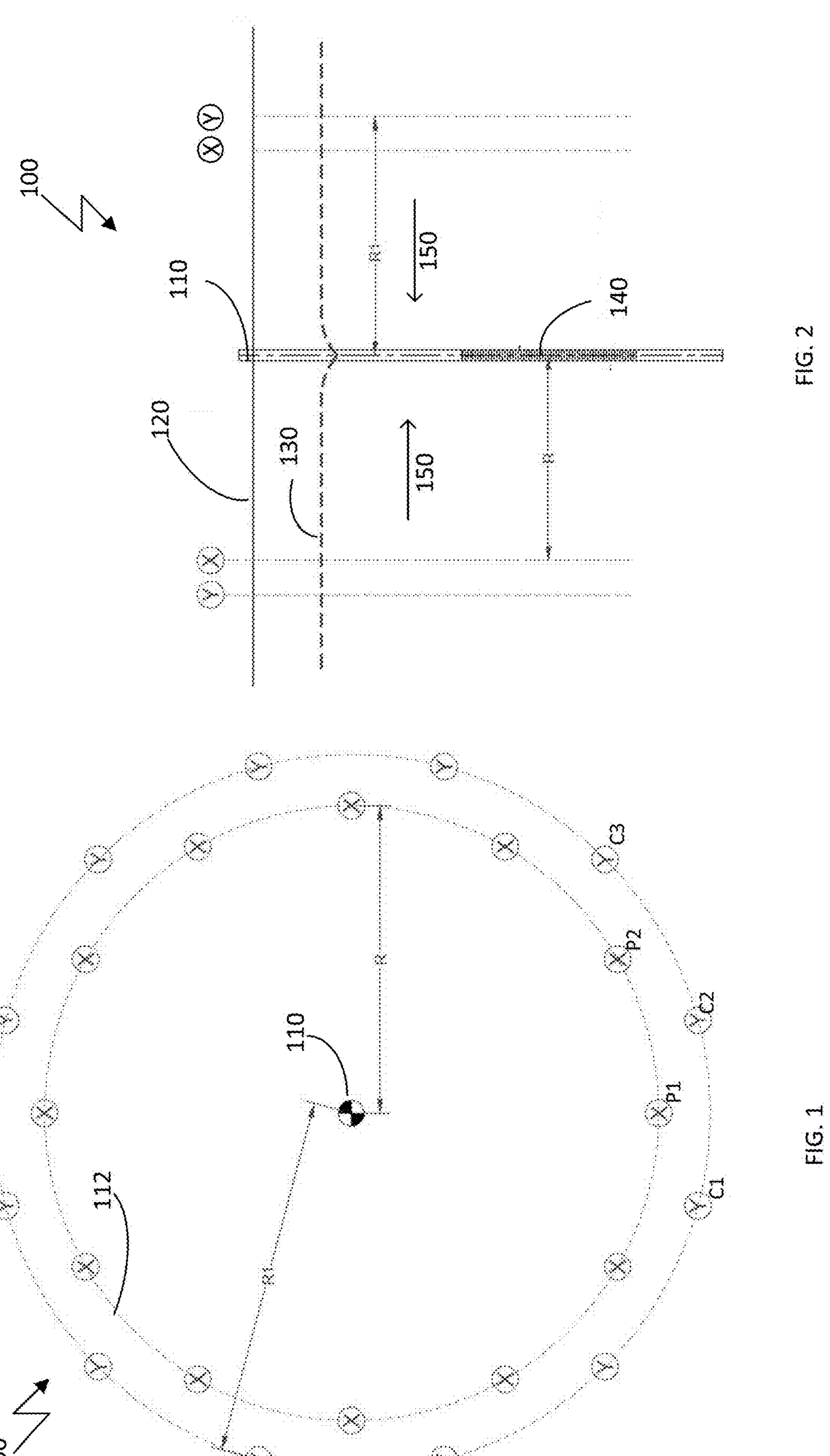
FIG. 1 provides a plan view of an exemplary drinking water system.
FIG. 2 provides a vertical cross-sectional view of the water system of FIG. 1.

These and other features of the examples described in the present disclosure will be better understood by reading the following detailed description, taken together with the Figures herein described. For purposes of clarity, not every component may be labeled in every drawing. Furthermore, as will be appreciated, the figures are not necessarily drawn to scale or intended to limit the present disclosure to the specific configurations shown. In short, the Figures are provided merely to show example structures.

DETAILED DESCRIPTION

Disclosed are techniques and structures for the in situ removal of contaminates from ground water prior to the water's entry into a drinking water well. Contaminants include regulated organic and inorganic compounds that can contaminate drinking water. Inorganic compounds include, for example, heavy metals. Organic compounds include hydrocarbons, halogenated organic compounds, chlorinated organic compounds, PFAS compounds and volatile organic compounds. Specific examples include benzene, carbon tetrachloride, dichloromethane (Methylene chloride), 1,2-Dichloroethane, 1,1-Dichloroethylene, tetrachloroethylene (PCE), trichloroethylene (TCE), vinyl chloride, chlorobenzene, ethylbenzene, styrene, toluene and xylenes. Specific PFAS compounds include, for example, perfluorooctanoic acid (PFOA), perfluorooctanesulfonic acid (PFOS), perfluorohexanesulfonic acid (PFHxS), perfluorononanoic acid (PFNA), hexafluoropropylene oxide dimer acid (HFPO-DA), and mixtures containing at least two or more of PFHxS, PFNA, HFPO-DA, and perfluorobutane sulfonate (PFBS). A complete list of PFAS compounds of interest is provided in USEPA's ToxCast Chemical Inventory at https://comptox.epa.gov/dashboard/chemical-lists/epapfas-inv.

By removing contaminants such as PFAS (perfluoroalkyl or polyfluoroalkyl) compounds from the ground water prior to their entry into a well, the water can meet drinking water standards without any subsequent ex situ treatment for PFAS. An adsorbent can be placed in the ground in an area where the water is known, or suspected, to contain a compound such as one or more PFAS compounds. The adsorbent forms a "filter wall" in the aquifer that allows the passage of water but removes target contaminants such as PFAS compounds. The adsorbent can be introduced into the soil column by, for example, sub-soil injection of an adsorbent colloidal dispersion. In some cases, the adsorbent can be left in place for more than a year, more than 10 years, or indefinitely.

The methods and systems described herein are in contrast to state of the art contaminant removal systems that isolate contaminants from drinking water after the water has been captured from a well or reservoir. While it might appear prohibitively expensive to apply a three-dimensional perimeter of adsorbent in the saturated zone surrounding a drinking water well, the methods described herein enable those skilled in the art to judiciously apply adsorbent to specific hot spots without the need to pass all water flowing to the well through the filter wall. This allows a majority of the contaminant to be removed without applying adsorbent to the entire perimeter of the well. The flow into a well typically is not evenly distributed 360 degrees around the well. Furthermore, a contamination source that leads to contamination of the well may be just one point source that can be hundreds of yards, or more, from the well. This means that the contaminated water may be isolated to a pathway traversing a few degrees along a circle drawn around the perimeter of the well. If contaminant levels can be reduced in water passing through this short arc, then the total contaminant levels in the well can be reduced to acceptable levels by targeting this specific section of the aquifer. In short, only the water that needs to be treated is treated. This can eliminate most, or all, of the costs associated with the installation and maintenance of ex situ PFAS removal systems, or can provide time for the development and implementation of ex situ systems that are better or less expensive than the current state of the art.

The adsorbent can be, for example, any substance that removes one or more PFAS compounds from water flowing through the ground. Appropriate adsorbents include carbonaceous materials such as activated carbon, graphene and carbon nanotubes. Additional adsorbents that may be effective include zeolites, alumina, ion-exchange resins and silica gel. Activated carbon has a high pore volume that is obtained by activating a lower porosity carbonaceous compound. Typically, carbonaceous materials are activated under conditions including high temperature and high oxygen, such as steam activation. Some sources of activated carbon include coal, gas, wood and coconut husks. Activated carbon is available in a variety of forms and can be suspended or dispersed in a liquid or can be used as a solid. Particle size and morphology can vary, with particle sizes from less than 1 μm to greater than 1 mm. In some embodiments, the adsorbent is activated carbon and has an average particle size of, for example, less than 10 μm, less than 5 μm, less than 3 μm, greater than 500 nm or greater than 1 μm. Specific size ranges include from 100 nm to 5 μm, from 250 nm to 3 μm, from 500 nm to 3 μm and from 1 μm to 3 μm. Unless otherwise specified, particle size is measured by ASTM D422. The adsorbent may exhibit a BET surface area of greater than 100, greater than 500 or greater than 1000 $m^2/g$. The adsorbent may have an Iodine number of greater than 100, greater than 500 or greater than 1000 mg/g. The adsorbent can be provided in the form of a colloidal dispersion and in some embodiments, activated carbon can be provided in an aqueous colloidal dispersion. The colloidal dispersion can include additives such as dispersants. The activated carbon can be provided at a concentration in an aqueous carrier of greater than 0.1%, greater than 1.0%, greater than 2.0%, greater than 5%, greater than 10% or greater than 20% by weight.

Some example methods of introducing the adsorbent to the aquifer are provided herein. In some embodiments, the adsorbent can be introduced as a solid or as a fluid. Fluids include liquids, suspensions and colloidal dispersions. A liquid, suspension or colloidal dispersion can be aqueous based and in some cases the only liquid present is water. The fluid can be injected into the aquifer at a depth and profile that is targeted at the specific portion of the aquifer that is contaminated. For example, a fluid can be injected into the ground using gravity, low pressure or high pressure injection equipment, or similar. For instance, a low pressure injector can be fed by a tank of colloidal carbon on the surface. In other embodiments, the adsorbent can be allowed to enter the subsoil by gravity. Regardless of how the adsorbent is applied, it may be preferred to allow the material time to adhere to the surrounding solid media, which can include, for example, one or more of sand, rock, clay and gravel. The filter wall can comprise media and an adsorbent. The media particles, e.g., sand particles, can be coated with the adsorbent which is physically bound to the media. Adsorbent particles may be in contact with adjacent particles to form a continuous mass connecting one media particle to an adjacent media particle via an adsorbent bridge. Pores can remain in between coated particles to allow the flow of water therethrough, however the water is forced to take a tortuous path through the adsorbent and organic compounds of interest, such as PFAS compounds, are adsorbed by the adsorbent. The PFAS can remain immobilized in the porous spaces of the adsorbent indefinitely.

In many embodiments, injection patterns are used that ensure that an entire segment is coated by at least some adsorbent in order to minimize the breakthrough of contaminant. The placement of injection points can depend on, for instance, the geology and depth of the segment, as well as the contaminant being targeted and the water flux through the segment. Injection points are typically spaced both vertically and horizontally. For example, if a segment is determined to be 100 feet wide and 20 feet tall, then injection points can be laid out in a pattern that will assure that the entire segment receives adsorbent. In some cases, this can mean 10 feet between injection points both horizontally and vertically. In this case, vertical injection points could be placed at 5 ft and 15 ft from the bottom of the segment to cover the entire vertical span of the segment. Similarly, horizontal injection points could be at 5, 15, 25, 35, 45, 55, 65, 75, 85 and 95 feet from either edge of the segment. Note that this embodiment would result in 20 points of injection to cover the 100 ft by 20 ft segment. Each injection would apply adsorbent to form a filter wall on about 200 square feet of the segment. In other embodiments, injection points can be spaced less than 50, less than 20, less than 5, greater than 1, greater than 5, greater than 10 or greater than 20 feet apart.

In one set of embodiments, the adsorbent is a carbonaceous material such as activated carbon and can be colloidally dispersed activated carbon. Once the soil constituents have been coated with carbon, the carbon tends to remain stably adhered to the surface of the constituents. Note that after coating, or adhering, the carbon particles are no longer colloidally dispersed. In order to allow the carbon particles time to adhere to the substrate, it may be beneficial to reduce or cease drawing water from the well being treated just before and after the adsorbent is deposited. This can prevent water from carrying the carbon particles over a distance that would render them less effective as a filter wall or could lead to carbon particles entering the well where they can interfere with non-organic treatment, disinfection, corrosion treatment etc. Once the carbon has adhered to the substrate particles, pumping from the well can resume and the carbon and substrate particles will retain their combined filter wall structure. In some cases, small amounts of carbon particles may be carried to the well, but the majority of the carbon should stay in place for months, years or decades. The period allowed for adherence after introduction of the adsorbent can be, for example, greater than 1 day, greater than 1 week or greater than 4 weeks. The filter wall formed by the adsorbent should not block the flow of water and can be permeable to water, allowing for greater than 50, 75 95 or 99% of the water flux that would occur absent the filter wall.

Example 1

FIGS. 1-3 illustrate one embodiment of how a drinking water well can be protected using the method described below.

FIG. 1 provides a plan view looking down on a water system 100 that includes well 110 and locations indicated by "X" where vertical profiling of the aquifer can be performed to determine the vertical and radial flux of contaminant such as PFAS that is entering the well from that position. Profiling can be done by sampling and analyzing the soil's hydraulic conductivity and water from the various X points throughout the vertical and radial influence of the well. Alternatively, the contaminant concentration can be modeled knowing the position(s) of sources of contamination, the composition of the media, and the general flow of water through the aquifer. Points indicated by "Y" are locations where a filter wall of adsorbent can be deposited in order to reduce the flux of contaminant passing through the periphery 112. As shown, the X locations are inside the perimeter of the Y locations, but in other embodiments the filter wall (Y) can be positioned inside the radius of the profiling locations X. FIG. 2 provides a profile cross-section view of the same water system 100 and illustrates water table level 130, ground level (grade) 120, well screen 140 and the direction of water flow into the well, 150.

Figure 3A:
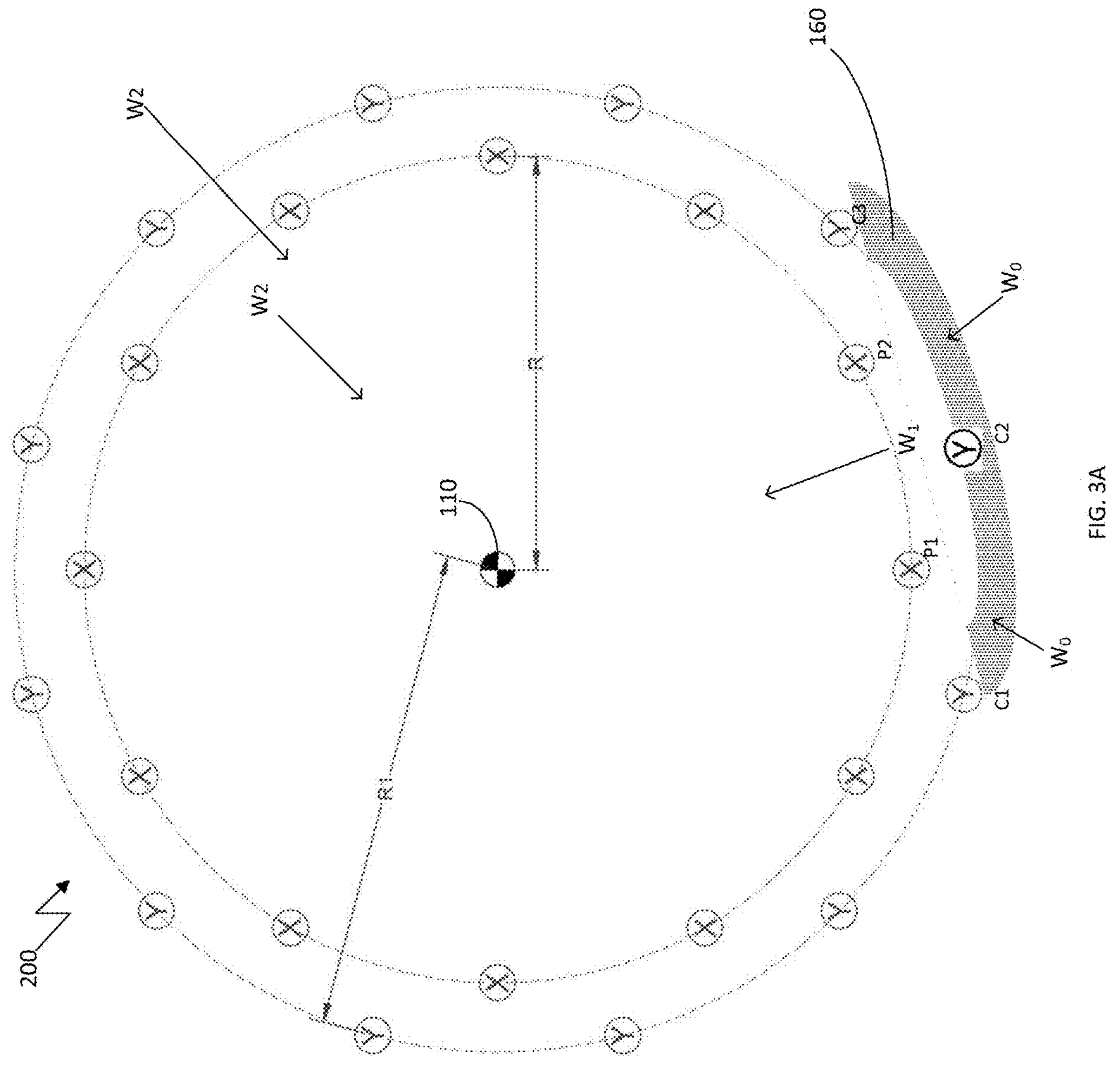
FIG. 3A provides a plan view of the water system of FIGS. 1 and 2 with a filter wall installed.
Figure 3B:
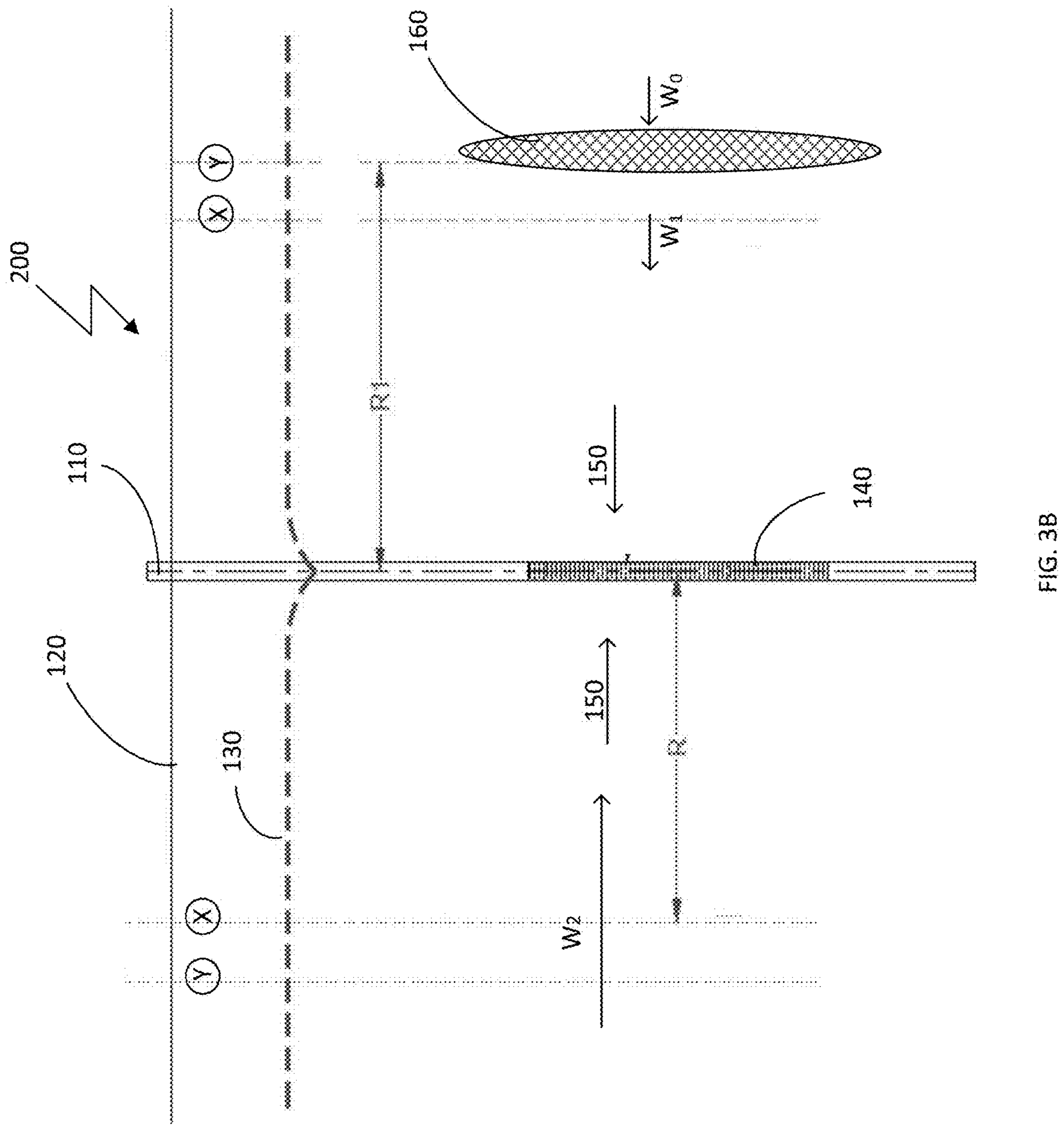
FIG. 3B provides a vertical cross-sectional view of the water system of FIG. 3A.

R and $R_1$ provide the radial distance from the well to the perimeter defined by X locations and Y locations, respectively. In various embodiments, R and $R_1$ can be greater than 50 feet, greater than 100 feet, greater than 250 feet, less than 1000 feet, less than 500 feet or less than 250 feet. The difference between R and $R_1$ can be less than 50 feet, less than 20 feet, less than 10 feet or less than 5 feet. While the perimeter is illustrated as a circle, it may be defined irregularly in some cases due to, for example, obstructions that prevent sampling and injecting in a circular plan. In the example shown, all of the X locations have been profiled and it has been determined that greater than 99% of contamination, in this case PFAS, is flowing into the well through the arc defined by the locations labeled P1 and P2. To reduce the flow of PFAS through this area, a vertical filter wall is built by injecting a colloidal dispersion of activated carbon (for example PlumeStop® or SourceStop® available from Regenesis) along the arc shown by the Y points marked as C1, C2 and C3. The resulting filter wall 160 is illustrated in FIGS. 3A and 3B. Filter wall 160 is in the saturated zone and is positioned vertically so that it intercepts the bulk of the contaminated water that flows to well screen 140. The filter wall can be substantially planar, can be in the curved shape of a partial cylinder or can be irregularly shaped. It can extend from the surface of the aquifer to the base of the aquifer or can be limited to a portion thereof, for example, the top half, the bottom half or the middle 50%. The arrow marked $W_0$ represents the flow of contaminated water into filter wall 160. The arrow marked $W_1$ represents the flow of water that has passed through the filter wall 160 toward well 110. In various embodiments, the ratio of the concentration of one or more specific PFAS compounds in $W_1$ compared to $W_0$ can be less than 1:5, less than 1:10, less than 1:20 or less than 1:50. Note that water from other areas ($W_2$) can enter the well as untreated, without passing through the filter wall. As shown, the flow labeled $W_2$ does not contribute to the PFAS load and therefore need not be treated. This can result in substantial savings as redundant treatment of portions of the aquifer that do not need to be treated is avoided.

Looking back at FIG. 1, it is evident that drinking water well 110 can be protected by forming a filter wall around only a small portion of the aquifer feeding the well. For instance, in one example, 10% of the water passing into drinking water well 110 passes through the filter wall 160. However, that relatively small amount of water accounts for greater than 99% of the total contamination received by the well. By forcing 10% of flow through the filter wall, the total amount of contaminant reaching the well can be reduced by more than 98 or 99%. This means that a well that was previously determined to contain PFAS at 10× the permitted level is now producing water at a concentration that is less than about 0.2× of the permitted level. This is achieved in the absence of an ex situ PFAS treatment system. This can be accomplished by building a filter wall of adsorbent that is exposed to less than 50%, less than 25%, or less than 10% of the total water flux to the well. In contrast, conventional treatment of the water after it has been received by the well requires filtration of 100% of the water received and the expense of the required operation and maintenance of such a system. The filter wall described herein requires little or no maintenance after it has been deposited and can be effective for more than 1 year, more than 5 years or more than 10 years. If the filter wall does fail to remove the desired amount of contaminant, another filter wall can be installed adjacent to the existing one. The original one does not need to be removed.

Process—

Figure 4:
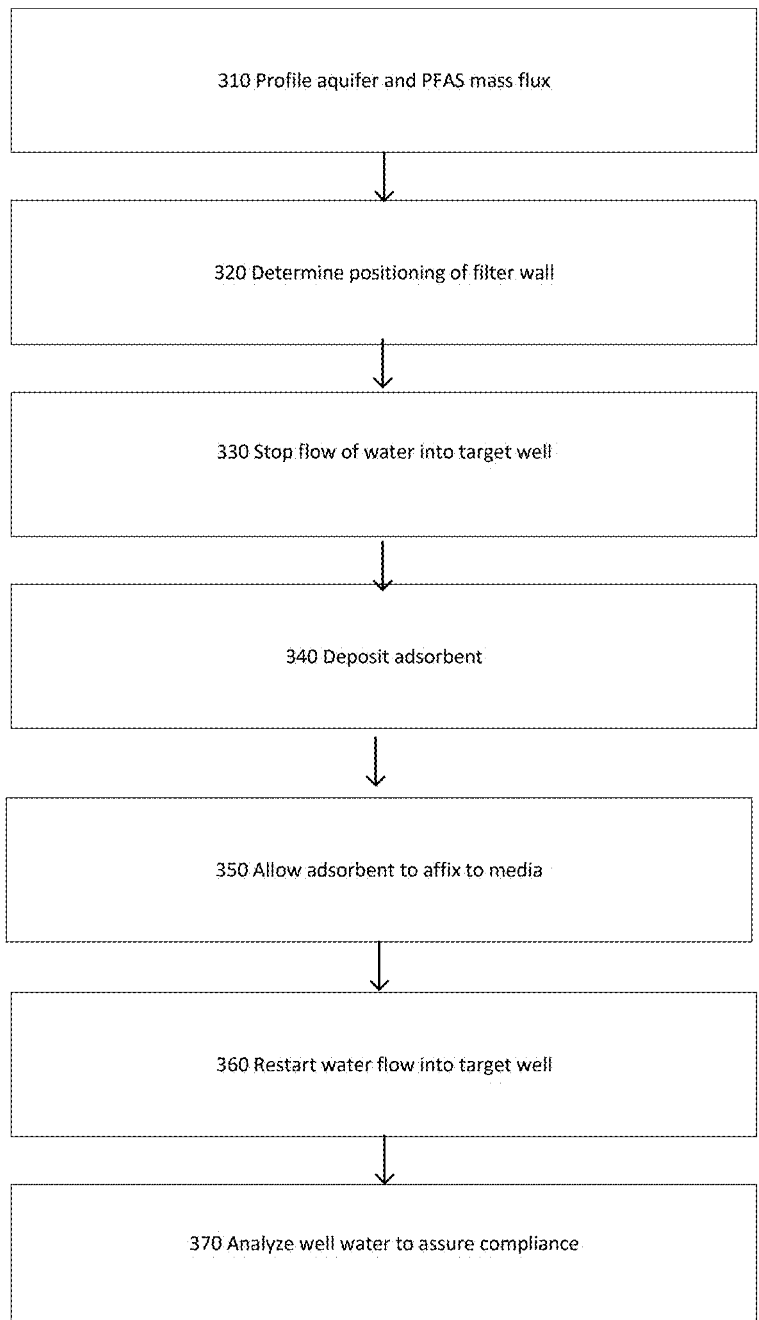
FIG. 4 is a flow chart illustrating one embodiment of a process for removing a contaminant from ground water.

FIG. 4 provides a flow chart showing one or more of the processes 300 involved with one of the methods disclosed herein.

Process 310 includes profiling the aquifer and quantifying the PFAS flux through the aquifer to the well. Profiling can include both specific location information and the amount of one or more PFAS compounds passing through the location. Specific location information can include distance from the well, lower depth, upper depth and width of the area being profiled. Profiling can be performed, in some cases, when the well 110 is drawing water. As water is removed from the well, water passes through the aquifer towards the well. Water can be drawn from 360° around the well or may be drawn from smaller segments alone while larger areas around the well provide little or no flow. Furthermore, while the flux of water to the well may originate from several segments, the PFAS flux may not be proportionate. This allows the flow of PFAS compounds to be targeted by a filter without interfering with the flow of water that does not contain PFAS. Profiling can be done by sampling and analyzing the soil's hydraulic conductivity, and the water, from the various X points throughout the vertical and radial influence of the well. Flux rates of PFAS compounds can also be modeled once the media has been characterized, the depth of the aquifer is estimated, and the concentration of PFAS compounds of interest is measured. Once PFAS flux rates are known from different segments around the radius of the well, it can be calculated how much PFAS needs to be removed from the aquifer before the water enters the well.

The positioning 320 of the filter wall is, in this embodiment, a function of the profiling of the aquifer and the amount of PFAS reduction required at the well. For example, if the amount of PFAS in the well water needs to be reduced by 90%, then filter walls can be deposited in areas through which greater than or equal to 90% of the total PFAS flows. This 90% may be accomplished by depositing a filter wall on a much smaller percentage than 90% of the circumference around the well. For example, a filter wall can be deposited along less than 180°, less than 120°, less than 90°, less than 60° or less than 30° of the periphery. For instance, if 95% of the PFAS entering the well is passing through only a critical 45° of the periphery, then a filter wall extending 60° and blanketing the 45° critical segment can remove more than 90% of the PFAS reaching the well. Within this radial segment the filter wall can extend from the top to bottom of the aquifer, or just specific portions thereof. Multiple filter walls can be deposited around the periphery of the well if various regions of high PFAS flux are indicated.

The radius at which the filter wall is deposited can be varied depending on a number of factors. The closer to the well, the shorter the radius and the smaller the filter wall can be. However, a closer filter wall may also be subject to saturation at a faster rate. In addition, at shorter radii, the velocity of the water through the media is greater and this may have a destabilization effect on the forces that adhere the adsorbent to the media. Faster velocities may also reduce the efficiency of PFAS removal from the water, given the shorter residence time in the filter bed. When deciding on placement of a filter wall, the closer the filter wall is to the well, the shorter the arc that needs to be covered, but this needs to be weighed against the shorter residence time that is due to the faster velocity of the water. In various embodiments, the filter bed can be deposited in areas of the aquifer that, under operating conditions, exhibit water flux rates of less than 100, less than 50, less than 10, less than 5 or less than 1 gal/ft$^2$/min. In the same and other embodiments the water flux rate can be greater than 0.1, greater than 1, greater than 5, greater than 10, greater than 25, greater than 50 or greater than 100 gal/ft$^2$/min.

In many embodiments, prior to deposition of the adsorbent 340, the flow through the aquifer to the well is reduced or stopped 330 by ceasing pumping. This provides the adsorbent time to adhere to the media and prevents adsorbent from being drawn into the well where it might need to be filtered out.

Deposition of adsorbent 340 can be carried out in a number of ways that result in a filter wall. The adsorbent can be deposited as a solid or liquid with liquids including suspensions and dispersions of solid particles in a solvent such as water. In a preferred set of embodiments a colloidal dispersion of solid particles in water, such as colloidally dispersed activated carbon, is injected into the aquifer at various locations in the segment being treated. For example, looking at FIG. 3A, the liquid can be injected at high or low pressure into Y locations C1, C2 and C3. At each of these locations, material can be released at one, two, three, four or more distinct depths. Material can also be released continually from top to bottom or bottom to top as the injection nozzle is moved vertically.

After the adsorbent has been deposited it can be allowed to affix to the media. Many types of adsorbents, such as colloidal carbon, can form strong bonds with media such as sand, rock and gravel. However, this adherence of the adsorbent particles to the media may not be instantaneous and in some cases can take more than 1 hour, more than a day, more than week or more than a month. The amount of time required can be affected by, for example, the type of media, the specific adsorbent, the temperature and the depth at which the adsorbent is being deposited. Adsorbent characteristics that may be taken into account include particle size, surface area, porosity, structure and surface energy. For instance, if the adsorbent is colloidal activated carbon having a particles size of less than 5 μm and a BET surface area of greater than 500 m$^2$/g then the settling time of the adsorbent in situ can be more than a day, more than a week or more than a month. During this settling time it can be important to avoid subjecting the injected adsorbent to moving water that can carry the adsorbent past the intended location of the filter wall. This undesirable transportation of adsorbent can lead to the entry of adsorbent into the well where it may have to be removed. The settling process can help the adsorbent cover migration pathways and can provide long-term back diffusion control.

Once the adsorbent is deemed to be stabilized in the filter wall, the flow of water to the well can be restarted 360. If properly affixed, greater than 75%, greater than 90% or greater than 95% of the adsorbent will be retained by the media (e.g., soil) after the well has been operated for a period of one month. The water entering the well can be monitored to assure that any entry of adsorbent is minimal and below or equal to expected amounts. At the same time, the well water can be analyzed for one or more PFAS compounds, or surrogates, to determine if the desired reduction in PFAS concentration is achieved. If the target is not reached, the filter wall can be reinforced or enlarged by injecting more adsorbent into the aquifer. The water can continue to be monitored for months or years to assure that the filter wall is retaining the target compounds and is still capable of adsorbing the materials of concern from the aquifer. If, after a period of time, the detected levels of target compound in the well are too high, the filter wall can be rebuilt, expanded or reinforced with more adsorbent that may be the same or different from the original adsorbent. In most cases, the existing filter wall will not need to be removed. Note that detected levels of contaminant in the well may be considered too high because of failure of the filter wall, an increase in the PFAS load in the aquifer or due to the implementation of more stringent regulations. Another factor to be considered when building, repairing or supplementing a filter wall is whether the PFAS source is limited or essentially infinite. If a limited source of PFAS is expected, a filter wall can be constructed to adsorb the known quantity. If the source is long term, or infinite, then plans can be made for supplementing or rebuilding a filter wall at certain time intervals or when monitoring shows that target levels are approaching their limit.

Examples

Example 1 is a method of preventing the intrusion of an organic contaminant into a drinking water production well, the method comprising identifying a first segment in an aquifer around the drinking water production well as a segment subject to a high flux of the organic contaminant when compared to other segments in the aquifer, depositing an adsorbent in the first segment to produce a filter wall, drawing water from the drinking water production well, and adsorbing organic contaminant on the filter wall while allowing water to pass through the filter wall.

Example 2 is the method of Example 1 comprising reducing or stopping a flow of water through the first segment prior to, or during, the deposition of the adsorbent.

Example 3 is Example 1 or 2 comprising delaying resumption of water flow through the first segment until the adsorbent has affixed to the media.

Example 4 is any of the prior examples wherein the adsorbent is injected into the soil and groundwater.

Example 5 is any of the prior examples wherein adsorbent is not deposited in segments of lower or no flux of the organic contaminant.

Example 6 is any of the prior examples wherein the organic contaminant is one or more PFAS compounds.

Example 7 is any of the prior examples wherein the filter wall has a generally planar or curved shape and is oriented perpendicular to the flow of water through the filter wall.

Example 8 is any of the prior examples wherein the adsorbent comprises colloidal activated carbon.

Example 9 is any of the prior examples wherein the well operation is ceased for at least 1 day, at least 3 days, at least 1 week or at least 1 month post deposition of the adsorbent.

Example 10 is any of the prior examples comprising testing the production well water for organic contaminant concentration after pumping water from the well.

Example 11 is any of the prior examples comprising testing the production well water for organic contaminant concentration repeatedly during operation of the well.

Example 12 is any of the prior examples wherein the filter wall reduces the flux of water through the space containing the filter wall by less than 50%, less than 20%, less than 10%, less than 5% or less than 1%.

Example 13 is any of the prior examples wherein the first segment covers less than 120°, less than 90°, less than 60° or less than 45° of a circle surrounding the production well.

Example 14 is any of the prior examples comprising identifying a plurality of segments in the aquifer around the drinking water production well as subject to a high flux of the organic contaminant and depositing the adsorbent to form a filter wall in each of the plurality of segments.

Example 15 is any of the prior examples wherein at least two segments exhibiting high flux of organic contaminant are separated horizontally from each other.

Example 16 is any of the prior examples wherein at least two segments exhibiting high flux of organic contaminant are separated vertically from each other.

Example 17 is any of the prior examples wherein injection points are selected to be less than 20 feet, less than 10 feet, less than 5 feet or less than 2 feet from each other.

Example 18 is any of the prior examples wherein injection points are horizontally and vertically spaced from each other.

Example 19 is a potable water supply system comprising a production drinking water well, a chemical contaminant present in at least a portion of the ground water feeding the well, and an in situ filter wall comprising an adsorbent fixed to media, the filter wall positioned between the production water well and a source of the contaminated ground water.

Example 20 is Example 19 wherein the filter wall covers less than half, less than one third, or less than one quarter of a periphery of the well.

Example 21 is Example 19 or 20 wherein the ground water has a first concentration of the chemical contaminant at a point outside the filter wall and the ground water has a second concentration of the chemical contaminant at a point between the well and the filter wall, wherein the first concentration is at least 50% greater than the second concentration.

Example 22 is any of Examples 19-21 wherein water is flowing through the filter wall and the production drinking water well is active.

Example 23 is any of Examples 19-22 wherein the adsorbent comprises activated carbon.

Example 24 is any of Examples 19-23 wherein the chemical contaminant comprises one or more PFAS compounds.

Example 25 is any of Examples 19-24 comprising one or more PFAS compounds adsorbed to the filter wall.

The foregoing description of examples and aspects thereof has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A method of preventing the intrusion of an organic contaminant into a drinking water production well, the method comprising:

identifying a first segment in an aquifer within 50 to 1000 feet of the drinking water production well as a segment subject to a high flux of the organic contaminant when compared to other segments in the aquifer;

depositing colloidal carbona at low pressure in the first segment to produce a filter wall;

drawing water from the drinking water production well;

adsorbing organic contaminant on the filter wall while allowing water to pass through the filter wall; and ceasing operation of the drinking water production well for at least 1 day post depositing the colloidal carbon.

2. The method of claim 1 comprising delaying resumption of water flow through the first segment until the colloidal carbon has affixed to media of the aquifer.

3. The method of claim 1 wherein the colloidal carbon is injected into the soil and groundwater.

4. The method of claim 1 wherein colloidal carbon is not deposited in segments of lower or no flux of the organic contaminant.

5. The method of claim 1 wherein the organic contaminant is one or more PFAS compounds.

6. The method of claim 1 wherein the filter wall has a generally planar or curved shape and is oriented perpendicular to the flow of water through the filter wall.

7. The method of claim 1 further comprising testing the production well water for organic contaminant concentration after pumping water from the well.

8. The method of claim 1 further comprising testing the production well water for organic contaminant concentration repeatedly during operation of the well.

9. The method of claim 1 wherein the filter wall reduces the flux of water through the space containing the filter wall by less than 10%.

10. The method of claim 1 wherein the first segment covers less than 120°, of a circle surrounding the drinking water production well.

11. The method of claim 1 comprising identifying a plurality of segments in the aquifer around the drinking water production well as subject to a high flux of the organic contaminant and depositing the colloidal carbon to form a filter wall in each of the plurality of segments.

12. The method of claim 11 wherein at least two segments exhibiting high flux of organic contaminant are separated horizontally from each other.

13. The method of claim 11 wherein at least two segments exhibiting high flux of organic contaminant are separated vertically from each other.

14. The method of claim 3 wherein injection points are selected to be less than 10 feet from each other.

15. The method of claim 14 wherein the injection points are horizontally and vertically spaced from each other.

* * * * *